United States Patent [19]

Adkins

[11] Patent Number: 5,008,134
[45] Date of Patent: Apr. 16, 1991

[54] ELECTROCONDUCTIVE COATING COMPOSITION

[75] Inventor: Kelvin P. Adkins, Elmstead Market, England

[73] Assignee: Imperial Chemical Industries PLC, London, England

[21] Appl. No.: 554,426

[22] Filed: Jul. 19, 1990

Related U.S. Application Data

[62] Division of Ser. No. 400,794, Aug. 30, 1989, Pat. No. 4,957,816, which is a division of Ser. No. 69,701, Jun. 30, 1987, Pat. No. 4,879,064.

[30] Foreign Application Priority Data

Jul. 2, 1986 [GB] United Kingdom ............... 8616186

[51] Int. Cl.$^5$ .................. B05D 3/02; B32B 27/36; B32B 27/38
[52] U.S. Cl. .................. 427/386; 252/500; 428/413
[58] Field of Search .............. 427/386; 252/500; 428/413

[56] References Cited

U.S. PATENT DOCUMENTS 4,772,421 9/1988 Ikenaga et al. ............... 524/401 X
4,879,064 11/1989 Adkins ......................... 252/500
4,957,816 9/1990 Adkens ....................... 428/413 X Primary Examiner—Michael Lusignan
Attorney, Agent, or Firm—Cushman, Darby & Cushman

[57] ABSTRACT

An electroconductive coating composition for a plastics substrate, such as a poly(ethylene terephthalate) film, comprises a polymeric electrolyte and a polyepoxy resin. Surface conductivity may be promoted by the inclusion of an enhancer or by treatment with an interactive solvent medium. Substrates coated with the composition exhibit substantially permanent antistatic characteristics when subjected to photographic processing techniques.

2 Claims, 1 Drawing Sheet

ELECTROCONDUCTIVE COATING COMPOSITION

This is a division of Ser. No. 07/400,794, filed Aug. 30, 1989, now U.S. Pat. No. 4,957,816, which is a division of Ser. No. 07/069,701, filed June 30, 1987, now U.S. Pat. No. 4,879,064.

BACKGROUND OF INVENTION (a) Technical Field of Invention

This invention relates to an electroconductive coating composition and, in particular, to an antistatic article comprising a polymeric substrate having, on at least one surface thereof, a layer of the electroconductive coating composition.

By an "antistatic article" is meant a treated polymeric article exhibiting a reduced tendency, relative to an untreated article, to accumulate static electricity on a surface thereof.

Articles in accordance with the invention may be produced by conventional polymer-forming techniques, including moulding, blowing, casting and extrusion, and may comprise fibres, filaments, sheets, films and the like, and particularly photographic films. For ease of discussion the invention is hereinafter described with reference to films.

(b) Background of the Art

The tendency of polymeric articles, such as films, to accumulate detrimental static electrical charges on surfaces thereof is well known. The presence of such charges creates a variety of problems including the attraction of dust and other contaminants to the film surface, the creation of a potential explosion hazard in the presence of organic solvents, difficulties in feeding the films through film handling and treating equipment, blocking, i.e. adhesion of the film to itself or to other films, and the risk of fogging subsequently applied light-sensitive coating layers. Consequently, it has been proposed to improve the electrical surface conductivity of polymeric films by treating the film with one or more of a variety of antistatic agents, the selected antistatic agent either being applied directly to a surface of the film, suitably in a volatile coating medium, or being incorporated into the polymeric material prior to fabrication of a film therefrom in the expectation that the antistatic agent will eventually migrate to a surface of the film.

Although many antistatic agents and coating compositions have been proposed for use in the treatment of film surfaces, their use is generally subject to a variety of constraints. For example, many available antistatic coating compositions are relatively hygroscopic, becoming swollen or softened by contact with moisture and therefore lack permanence when applied to substrates which may subsequently be exposed to relatively high degrees of humidity. In particular, water-soluble antistatic compositions are prone to removal during conventional photographic aqueous-processing techniques, and therefore are less than satisfactory in the treatment of photographic products, such as microfilms. Thus, a microfilm fiche or reel from which an applied antistatic coating medium has been partially removed during processing may be susceptible to pick-up of dust with consequent deleterious effects on the product. Such defective products also exhibit a blocking phenomenon whereby adjacent layers of microfilm tend to stick to each other to the detriment of the handling characteristics of the product. Furthermore, water-soluble antistatic coatings tend to be relatively soft, and therefore liable to abrasion during subsequent processing and handling-with the attendant generation of unacceptable debris, usually referred to as "pay-off" in the photographic art. Abrasion of an antistatic backing layer is of particular concern in relation to reeled films intended for use in high speed document-copying cameras. Backing "pay-off" is also particularly serious when it occurs during subsequent deposition, on the opposite surface of the film, of additional layers—such as antihalation and light-sensitive photographic emulsion layers. Transfer of abraded debris from the antistatic backing layer into the opposed emulsion layer may result in the generation of unacceptable pin-holes in the finished product.

We have now devised an electroconductive coating composition which eliminates or substantially overcomes the aforementioned difficulties.

SUMMARY OF THE INVENTION

Accordingly, the present invention provides an electroconductive composition for coating a plastics substrate characterised in that the composition comprises a polymeric electrolyte and a polyepoxy resin.

The invention also provides a coated article comprising a polymeric substrate having, on at least on surface thereof, a layer of a composition comprising a polymeric electrolyte and a polyepoxy resin.

The invention further provides a method of producing a coated article comprising applying to at least one surface of a polymeric substrate a coating composition comprising a polymeric electrolyte and a polyepoxy resin.

DETAILED DESCRIPTION AND PREFERRED EMBODIMENTS OF THE INVENTION

Figure 1:
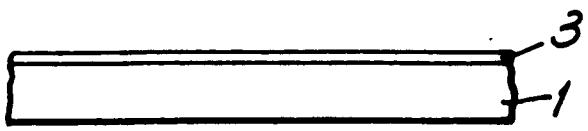

A polymeric electrolyte for use in the compositions of the invention comprises an electroconductive polymer of the kind which conducts an electrical current through ionization. Typical electroconductive polymers include polystyrene sulphonic acid, and polyacrylic acid, and salts thereof. However, to facilitate application as a solution in a mutual solvent, as hereinafter described, it is preferred to employ a cationic polyelectrolyte, such as poly-N-(methacryloyloxyethyl)-trimethyl ammonium chloride or a copolymer thereof with a copolymerisable monomer, such as acrylamide. To improve the cohesive strength of the electroconductive coating, and to promote the adhesion thereof to a polymeric substrate, the electroconductive polymer preferably comprises a cross-linkable moiety. A particularly suitable electroconductive polymer comprises a cationic methacrylic polyelectrolyte, optionally incorporating a cross-linkable methylol functionality (introduced, for example, by reaction of an acrylamide copolymer component with formaldehyde). Other suitable cationic polyelectrolytes include polyvinyl benzyl-trimethyl-ammonium chloride and a homopolymer of di-alkyl-di-methyl-ammonium chloride.

Conventional polyepoxy resins are suitable for inclusion in the coating compositions of the invention including those curable by thermal or radiation techniques. Such resins may be mono-, di- or poly-functional, and a suitable thermally-curable resin comprising at least two 1,2-epoxy ring structures in the molecule, is conveniently derived from an epoxy compound of the general formula:

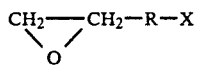

wherein:

R is an alkylene group (branched or linear) of up to 4 carbon atoms, and

X is a reactive group, particularly a halogen—such as chlorine or bromine.

Such epoxy compounds include an epihalohydrin, particularly epichlorohydrin or β-methylepichlorohydrin.

A preferred polyepoxy resin is prepared by condensation of the reactive group X of the aforementioned compound with a compound containing an active hydrogen atom—in for example, a phenolic hydroxyl, a carboxylic or an amino group. Suitable reactive compounds include 4,4'-diaminodiphenylmethane, 1,4-butanediol, resorcinol, glycerol, pentarythritol and phenolic novolacs. A particularly preferred polyepoxyresin, of relatively high molecular weight, is obtained by condensation of epichlorohydrin with a bisphenol A to yield a polymer having the repeat unit:

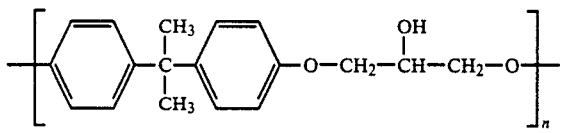

wherein: n is an integer.

The polyepoxy resin conveniently has an epoxy molar mass (grams of resin containing 1 gram-equivalent of epoxide) of from about 1000 to 5,000 and preferably from about 2400 to about 4000.

Suitable radiation-curable resins include cycloaliphatic epoxies, and the UV-curable acrylate or methacrylate resins derived by reaction of an epoxy resin with acrylic or methacrylic acid, or a derivative thereof.

The relative proportions of the respective components in the coating composition may be varied over a wide range, as required, but conveniently a composition comprises a polyepoxyresin and a polymeric electrolyte in a weight ratio of from 0.5:1 to 20:1 and preferably of from 2:1 to 10:1.

The coating composition is conveniently applied to a polymeric substrate by a conventional coating technique—for example, by deposition from a solution or dispersion of the electrolyte and epoxy resin in a volatile medium, particularly an organic solvent medium—such as methyl ethyl ketone, methanol, or mixtures thereof. To maintain adequate compatibility of the electrolyte and epoxy resin, it is preferred that the solvent medium comprises a minor (i.e. less than about 10% by volume based on the total solvent volume) but effective amount of a mutual solvent for the electrolyte and epoxy resin, the mutual solvent having a high boiling point (i.e. at least 100° C. and preferably at least 150° C.). A particularly suitable high boiling point solvent is benzyl alcohol (δ-hydroxy toluene) having a boiling point, at atmospheric pressure, of about 205° C. A preferred solvent comprises methyl ethyl ketone/methanol/benzyl alcohol in an approximate ratio of 65:30:5 by volume.

Drying of the applied coating composition may be effected by a conventional drying technique—for example, by suspending the coated substrate in a hot air oven maintained at an appropriate temperature to dry and/or cure the applied resin composition. A drying temperature of from about 100° to 120° C., is usually suitable for a polyester substrate.

The coating composition is suitably applied to a substrate at a concentration level which will yield an electroconductive layer having a relatively thin dry coat thickness—for example, generally less than 0.5 micron, preferably less than 0.25 micron, and particularly from 0.05 to 0.2 micron.

If desired, the electroconductive coating composition may additionally comprise an enhancer to promote electrical surface conductivity. Suitable enhancers, which desirably exhibit relatively low volatility (for example an evaporation time per unit volume, relative to diethyl ether of at least 10) and a relatively high dielectric constant (for example, greater than 30, and preferably greater than 35, at 25° C.) include aldehydes, such as formaldehyde, and polyhydric alcohols (e.g. $C_1$ to $C_5$ especially $C_1$ to $C_3$ alcohols) particularly dihydric alcohols such as ethylene glycol and propane-1,3-diol and trihydric alcohols, such as glycerol. In aqueous solution, the formaldehyde may exist as the hydrate methylene glycol, and may therefore be considered to function analogously as a polyhydric alcohol. Formaldehyde is particularly effective as an enhancer when employed in a freshly prepared (less than 12 hours old) coating composition. The enhancer, if present, is suitably employed in a proportion of from about 50 to 200%, and particularly from 75 to 150%, by weight of the combined total of electroconductive polymer and epoxy resin.

The mechanism by which the enhancer promotes electrical surface conductivity is not fully established, but it may be postulated that the enhancer functions to influence the solvent parameters of the coating medium in the latter stages of drying, thereby affecting the distribution and/or configuration of the polyelectrolyte within the epoxy resin matrix. Effectively, therefore, it is believed that the enhancer promotes a solvent-induced phase segregation.

To improve resistance to marking during processing, the electroconductive coating composition may optionally comprise a curing agent for the epoxy resin. Suitable curing agents include aminoderivatives, such as an ethylenediamine-epoxy adduct. The curing agent, if present, is conveniently employed in an amount of up to 50%, preferably from 25 to 35%, by weight of the epoxy resin.

To promote adhesion of the electroconductive layer to the polymeric substrate, it may be desirable first to treat a surface of the substrate with a priming or etchant medium. Creation of a priming layer is conveniently effected by treating a surface of the polymeric substrate with an agent known in the art to have a solvent or swelling action on the substrate polymer. Examples of etchants which are particularly suitable for the treatment of a polyester substrate, include a halogenated phenol, such as p-chloro-m-cresol, 2,4-dichlorophenol, 2,4,5- or 2,4,6-trichlorophenol or 4-chlororesorcinol. The priming layer may be created by treating a surface of the substrate with a solution of the etchant in a common organic solvent, such as acetone or methanol. Alternatively, the etchant may be incorporated into the electroconductive coating medium.

To develop the electrical surface conductivity of an electroconductive coating layer deposited on a polymeric substrate, the coating layer may be exposed to an interactive solvent medium capable of preferentially attacking or partially dissolving the electrolyte from the coating layer. Interactive solvent systems with which the deposited electroconductive layer may be washed or glazed include $C_1$ to $C_{10}$, especially $C_1$ to $C_6$, aliphatic alcohols, and particularly primary monohydric alcohols such as methanol, n-propanol, n-butanol, n-hexanol and cyclohexanol, secondary monohydric alcohols such as iso-propanol, and tertiary monohydric alcohols such as tertbutanol. Dihydric alcohols such as methylene glycol and propane-1,3-diol are also suitable.

The degree of attack of the interactive solvent on the latent antistatic layer may be moderated (to prevent surface blush) by diluting the interactive solvent with an inert diluent such as an aliphatic hydrocarbon (e.g. n-hexane) or a polyhalo-hydrocarbon (e.g. 1,1,1-trichloroethane), Conveniently, therefore the electroconductive layer is solvent-glazed with an interactive medium comprising an alcohol, such as methanol, and an inert diluent.

The ratio of interactive solvent to inert diluent is dependent, inter alia, on (1) the required degree of surface conductivity/hydrophilicity, (2) the required degree of optical clarity (3) the nature of the latent antistatic layer (e.g. the ratio of epoxy resin to polyelectrolyte and the degree of cross-linking), and (4) the relative properties (e.g. volatility and molecular association) of the interactive solvent and inert diluent. Desirably, therefore, the inert diluent content of the glazing medium should be within a range of from about 30 to 99.5%, by volume of the interactive solvent medium preferably from 45 to 65%, (in the case of a solvent-only interactive medium), or from 90 to 98% (in the case in which the medium incorporates a wax, as hereinafter described). Increasing the content of inert diluent above about 99.5% by volume reduces the surface conductivity of the coating layer, while decreasing the content below about 30% by volume tends to increase the haze and blush characteristics of the coating layer.

Enhancement of electrical surface conductivity may also be effected by exposure of the latent antistatic layer to the interactive solvent medium in vapour form.

The surface friction, anti-blocking and abrasion resistance of the electroconductive layer may be improved, if desired, by deposition thereon of a surface-friction modifier, such as a wax—typically, carnauba wax, or of an anti-blocking agent, such as colloidal or particulate silica. Deposition of a wax layer is conveniently effected by incorporating the wax in the interactive solvent medium to yield a wax coating comprising microcrystalline aggregates, and having a dry-coat weight of less than about 25 mgm$^{-2}$, preferably from about 3 to 16 mgm$^{-2}$. A similar improvement in th aforementioned properties may be effected by formation of the electroconductive layer on a sub-coating layer having a rough surface (e.g. a cross-linked epoxy resin containing a particulate filler, suitably silica of nominal particle size of the order of 2 μm).

The substrate may comprise any suitable polymeric material in a configuration governed essentially by the envisaged end-use therefor. Typically, the substrate will normally be in the form of a self-supporting film, sheet or plate.

By a "self-supporting film, sheet or plate" is meant a structure capable of an independent existence in the absence of a supporting base.

Suitable polymeric materials for use in the production of a substrate are usually thermoplastics polymers, and include cellulose esters, e.g. cellulose acetate, polystyrene, polyamides, polymers and copolymers of vinyl chloride, polymers and copolymers of olefines, e.g. polypropylene, polysulphones, polycarbonates and particularly linear polyesters which may be obtained by condensing one or more dicarboxylic acids or their lower alkyl (up to 6 carbon atoms) diesters, e.g. terephthalic acid, isophthalic acid, phthalic acid, 2,5-2,6-and 2,7-naphthalene dicarboxylic acid, succinic acid, sebacic acid, adipic acid, azelaic acid, diphenyldicarboxylic acid and hexahydroterephthalic acid or bis-p-carboxyl phenoxy ethane (optionally with a mono-carboxylic acid, such as pivalic acid) with one or more glycols, e.g. ethylene glycol, 1,3-propanediol, 1,4-butanediol, neopentyl glycol and 1,4-cyclohexane-dimethanol. A biaxially oriented and heat-set film of polyehtylene terephthalate is particularly useful as a substrate for the production of photographic elements, and may be produced by any of the processes known in the art, for example—as described in British patent No. GB 838708.

The thickness of the substrate will depend, inter alia, on the envisaged end-use but will generally be within a range of from 2 to 3000 microns, and paricularly from 50 to 175 microns for use in microfilms and the like.

The coating compositions of the invention are of utility in a variety of applications including the production of photographic and reprographic elements in which the coating composition may be employed to provide a backing layer with relatively permanent antistatic characteristics. Other applications include the production of antistatic elements such as diazo microfilms, floppy discs, membrane touch switch films, electrophotographic transparencies, the provision of antimisting films for horticultural applications—such as greenhouse films, antifouling paints, moisture permeable protective and/or decorative coatings, and anticondensation coatings.

Beneficial characteristics of coating compositions according to the invention include:
High cohesive strength;
Good adhesion to halophenol-primed polyester substrates;
Very high light transmission;
Processing-resistant electrical surface conductivity;
Good antistatic properties at low relative humidity;
High flexibility;
Photographically inert;
Optional low surface friction The electrical surface conductivity and hydrophilicity of the coatings can be controlled by two independent means:
 (i) Varying the ratio of conductive resin to epoxy binder
 (ii) Varying the solvent parameters of the interactive supercoat.

Figure 2:
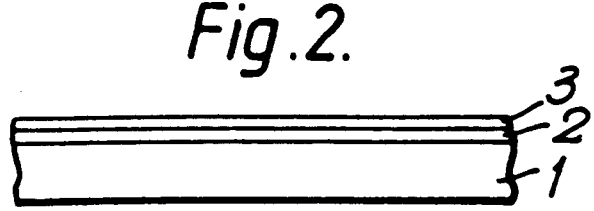
Figure 3:
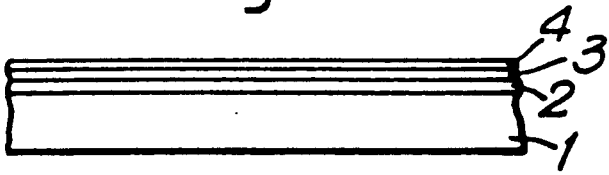
Figure 4:
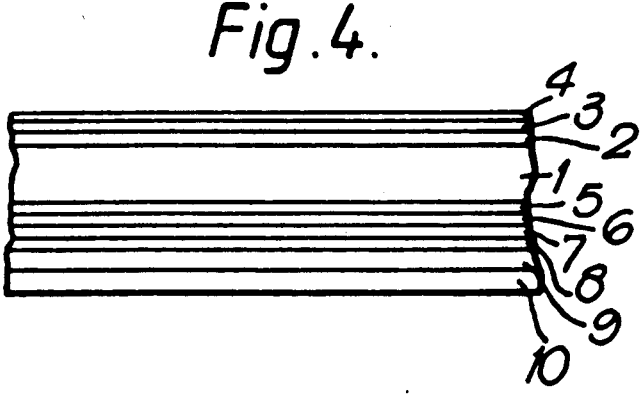

The invention is illustrated by reference to the accompanying drawings (not to scale) in which:

FIG. 1 is a schematic elevation of a portion of an article comprising a polymer film substrate 1 to one surface of which an electroconductive coating has been applied, and dried to form an electroconductive layer 3, FIG. 2 is a fragmentary schematic elevation of a similar film in which an etchant layer 2 has been deposited on substrate 1 prior to deposition of electroconductive layer 3, FIG. 3 is a fragmentary elevation of a similar film, incorporating an additional interactive solvent or glazing layer 4, and FIG. 4 is a fragmentary elevation of a typical photographic element comprising a film substrate 1 having on one surface a backing layer comprising etchant layer 2, electroconductive layer 3 and glazing layer 4, and, on the other surface, the component layers 5, 6, 7 and 8 of a conventional gelatinous photographic subbing assembly, an antihalation undercoat 9 and a light-sensitive photographic emulsion layer 10.

The invention is further illustrated by reference to the following Examples.

EXAMPLE 1

One surface of a transparent, biaxially oriented, uncoated, polyethylene terephthalate film base sheet of about 100 microns thickness was treated with a solution in methanol of p-chloro-m-cresol (2.0% weight vol).

The treated sheet was then dried for 2 minutes in a hot air oven maintained at a temperature of 80° C. to leave a residual etchant layer of less than about 0.025 micron thickness.

The etched surface was then coated with the following solution:

| | |
|---|---|
| EPIKOTE (trademark) 1009 | 0.66 g |
| ALCOSTAT (trademark) 684 (20 wt % aqueous soln) | 1.10 g |
| Benzyl alcohol | 3.9 ml |
| Methanol | 30.0 ml |
| Methyl ethyl ketone | 64.0 ml | and the coated base sheet was dried at a temperature of 110° C. for 4 minutes to yield an electroconductive layer of about 0.2 micron thickness (dry coat weight 140 mdm$^{-2}$).

(EPIKOTE 1009 (supplied by Shell) is a bisphenol A-epichlorohydrin epoxy resin of relatively high Molecular Weight (number average)—3750; ALCOSTAT 684 (supplied by Allied Colloids) is a cationic ester type cross-linkable polyelectrolyte comprising a copolymer or N-(methacryloyloxyethyl)-tri-methyl ammonium chloride and acrylamide)

The electrical surface resistivity of the applied latent electroconductive layer was $5 \times 10^{12}$ ohms/square at 20° C. and 60% Relative Humidity.

The electroconductive surface coating layer was then further treated with an interactive solvent medium comprising:

| | |
|---|---|
| GENKLENE (trademark) | 55 ml |
| Methanol | 45 ml | and the treated film dried at a temperature of 80° C. for 2 minutes to yield a solvent-glazed coating of less than about 0.025 micron thickness.

(GENKLENE (supplied by Imperial Chemical Industries PLC) is 1,1,1-trichloroethane).

The electrical surface resistivity of the solvent-glazed coating was $5 \times 10^8$ ohms/square (20° C.; 60% RH).

To simulate a conventional photographic processing technique, the solvent-glazed film was then subjected to the following sequential processing stages at ambient temperature (approximately 20° C.):

(i) 4 minutes immersion in 2 parts water: 1 part ID2 developer (Silver Lining).

(ii) 10 minutes immersion in 2 parts water: 1 part IF-23 fixer (Ilford).

(iii) 15 minutes wash under running water.

(iv) Wipe dry with paper tissue.

The electrical surface resistivity of the conductive surface of the processed film was $5 \times 10^9$ ohms/square. The electrical conductivity characteristics of the film were therefore substantially resistant to photographic processing, and are summarised in the following Table.

TABLE

| SAMPLE | SURFACE RESISTIVITY (ohms/square) 60% RH; 20° C.) |
|---|---|
| Without solvent wash | $5 \times 10^{12}$ |
| With solvent wash | $5 \times 10^8$ |
| With solvent wash, after 'photographic processing' | $5 \times 10^9$ |

EXAMPLE 2

A permanent antistatic assembly exhibiting low surface friction was prepared according to the procedure outlined in Example 1, save that the interactive solvent wash (coating) was replaced with a wax-containing solution of the following composition:

| | |
|---|---|
| Carnauba wax (Hopkin and Williams) | 0.048 g |
| GENKLENE | 95 ml |
| Methanol | 5 ml |

The resultant assembly exhibited surface conductivity characteristics similar to those of Example 1. In addition, the assembly obtained in Example 2 possessed low surface friction and improved resistance to marking during processing compared with the assembly of Example 1.

EXAMPLE 3

A permanent antistatic assembly, exhibiting improved resistance to marking during processing compared to that of Example 1, was prepared according to the procedure of Example 1, save that the coating solution forming the electroconductive layer contained in addition to those components listed in Example 1:

0.20 g EDA adduct 870—an epoxy curing agent (supplied by Anchor Chemical), and of utility, because of its low sensitometric activity, in coatings for photographic applications.

The resultant assembly exhibited electrical surface conductivity characteristics comparable to those of Example 1.

EXAMPLE 4

A permanent antistatic treatment was applied as a single coating, i.e. without an interactive solvent wash, to a polyethylene terephthalate substrate etched as described in Example 1.

The etched surface of the substrate was coated with an electroconductive solution of composition identical to that described in Example 1, save that the formulation additionally contained 1.25 ml formaldehyde solution (38% w/v) as a conductivity enhancer.

Surface resistivity was measured on the resultant coating and on a sample after photographic processing (as described in Example 1), to yield the values summarised in the following Table.

TABLE

| SAMPLE | SURFACE RESISTIVITY (OHMS/SQ) (60% RH; 20° C.) |
|---|---|
| Unprocessed | $5 \times 10^8$ |
| Processed | $1 \times 10^{10}$ |

EXAMPLES 5 AND 6

To demonstrate the behaviour of different polymeric electrolytes the procedure of Example 1 was repeated save that:

(1) electroconductive coatings A and B were applied, respectively, to the etched film base, and (2) the wax-containing solution of Example 2 was employed as the interactive solvent medium.

The electrical surface resistivity of the conductive surface of the respective films was assessed initially after treatment with the interactive solvent medium and again after simulated processing. Results are recorded in the following table.

TABLE

| Example | Antistatic Coat* | Surface Resistivity ohm/sq 60% RH; 20° C. | |
|---|---|---|---|
| | | Initial | After simulated processing** |
| 5 | A | $3.8 \times 10^8$ | $4.1 \times 10^{10}$ |
| 6 | B | $1.6 \times 10^8$ | $4.7 \times 10^8$ |

*A - formulation as in Example 1 save that 0.66 g ECR 34 (Dow Chemical Co) (33.5% aqueous solution) used in place of ALCOSTAT 684. ECR 34 is a polyvinyl benzyl trimethyl ammonium chloride.
B - formulation as in Example 1 save that 0.73 g ALCOSTAT 567 (Allied Colloids) (30% aqueous solution) used in place of ALCOSTAT 684)

ALCOSTAT 567 - is a poly-N-(methacryloyloxyethyl) - trimethyl ammonium chloride.
**Simulated processing involves the following sequential steps:
i immersion in cold water (20° C.) for 1 hour
ii wipe dry with paper tissue
iii drying in oven for 2 hours at 35° C.
iv conditioning for 1 hour at 60% RH, 20° C.

The initially good electrical conductivity characteristics of the treated surfaces were therefore subtantially resistant to further processing.

EXAMPLES 7 TO 12

To demonstrate the performance of different epoxy resins the procedure of Example 1 was repeated save that:

1. The electroconductive coatings applied respectively to the etched film base comprised
(a) Specified Epoxy resin
(b) EPICURE 124 *
(c) ALCOSTAT 684 in a solids ratio (a):(b):(c) of 2:1:1, together with
(d) mixed methanol/methylethylketone solvent, as specified in Example 1, 2. The dried electroconductive layer was not treated with an interactive solvent medium.

* EPICURE 124 is a modified cycloaliphatic amine curing agent supplied by Shell.

Electrical surface resistivities were measured, as described in Examples 5, 6, initially and then after the defined simulated processing. Results are recorded in the following Table

TABLE

| | | Surface resistivity ohm/sq 60% RH 20° C. | |
|---|---|---|---|
| Example | Epoxy Resin* | Initial | After simulated processing |
| 7 | DER732 | $8.9 \times 10^8$ | $1.3 \times 10^{11}$ |
| 8 | DER736 | $5.2 \times 10^8$ | $6.6 \times 10^9$ |
| 9 | QUATREX 6410 | $4.9 \times 10^8$ | $2.3 \times 10^{10}$ |
| 10 | EPIKOTE 191 | $5.8 \times 10^8$ | $7.1 \times 10^9$ |
| 11 | EPIKOTE 155 | $7.5 \times 10^8$ | $1.0 \times 10^{10}$ |
| 12 | EPIKOTE 1009 (Control) | $2.0 \times 10^{10}$ | $1.2 \times 10^{11}$ |

(Above values are averages of three readings)
*The epoxy resins respectively employed in the formulations of Examples 7 to 12 are identified as follows:

| Resin | Manufacturer | Epoxy Type | Epoxide Equivalent Weight/g |
|---|---|---|---|
| DER 732 | Dow | epichlorohydrin polyglycol | 305-335 |
| DER 736 | " | epichlorohydrin polyglycol | 175-205 |
| QUATREX 6410 | " | glycidyl ether of brominated bisphenol A | 450 |
| EPIKOTE 191 | Shell | glycidyl ester | 145-165 |
| EPIKOTE 155 | " | polyfunctional epoxy novolak | 190 |
| EPIKOTE 1009 | " | bisphenol A-epichlorohydrin | 2400-4000 |

EXAMPLES 13 TO 19

To demonstrate the influence of a conductivity enhancer included in the electroconductive coating solution the procedure of Example 4 (i.e. interactive wash not employed) was repeated save that the respective enhancers and amounts thereof were as specified in the following Table.

Electrical surface resistivities were measured, as described in Examples 5 and 6, initially and then after the defined simulated processing. Results are recorded in the following Table.

TABLE

| Example | Enhancer | Dielectric Constant 20/25° C. | Quantity[1] ml | Surface resistivity ohm/sq 60% RH 20° C. | |
|---|---|---|---|---|---|
| | | | | Initial | After simulated processing |
| 13 | Formaldehyde solution[2] | — | 5 | $9.3 \times 10^{8(3)}$ | $9.6 \times 10^9$ |

TABLE-continued

| Example | Enhancer | Dielectric Constant 20/25° C. | Quantity[1] ml | Surface resistivity ohm/sq 60% RH 20° C. | |
|---|---|---|---|---|---|
| | | | | Initial | After simulated processing |
| 14 | Ethanediol | 37.7 | 2 | $6.2 \times 10^8$ | $6.1 \times 10^9$ |
| 15 | Glycerol | 42.5 | 2 | $2.2 \times 10^8$ | $8.9 \times 10^9$ |
| 16 | Propan-1,3-diol | 35.0 | 1 | $2.7 \times 10^8$ | $7.8 \times 10^9$ |
| 17 | 2,3 dimethyl butan 2,3 diol | — | 2 | $\infty$ | $3.0 \times 10^{12}$ |
| 18 | 2 methyl pentan-2,4-diol | — | 1 | $1.1 \times 10^{12}$ | $6.2 \times 10^{11}$ |
| 19 | None (as Example 1) | — | — | $5 \times 10^{12}$ | $\infty$ |

NOTES
[1]Volume of enhancer used in addition to basic formulation as per Example 1.
[2]Formaldehyde solution formulation: 75 ml methyl ethyl ketone
25 ml 38% aqueous formaldehyde
[3]Coating solution applied to support 2 hrs after preparing solution.

EXAMPLES 20 TO 32

To demonstrate the use of various interactive solvent media the procedure of Example 1 was repeated save that the electroconductive layer of each film sample was treated with the respective solvent medium identified in the following Table.

Electrical surface resistivities were measured, as described in Examples 5 and 6, initially and then after the defined simulated processing. Results are recorded in the following Table.

| Example | Interactive solvent medium | Surface resistivity ohm/sq 60% RH 20° C. | |
|---|---|---|---|
| | | Initial | After simulated processing |
| | Primary Alcohols | | |
| 20 | 90 ml GENKLENE + 10 ml ethanol | $1.6 \times 10^8$ | $1.6 \times 10^9$ |
| 21 | 98 ml GENKLENE + 2 ml propan-1-ol | $2.5 \times 10^8$ | $1.8 \times 10^9$ |
| 22 | 98 ml GENKLENE + 2 ml butan-1-ol | $1.6 \times 10^8$ | $1.3 \times 10^9$ |
| 23 | 98 ml GENKLENE + 2 ml hexan-1-ol | $1.5 \times 10^9$ | $1.3 \times 10^{10}$ |
| 24 | 98 ml GENKLENE + 2 ml cyclohexanol | $5.8 \times 10^8$ | $2.8 \times 10^9$ |
| 25 | 90 ml n-hexane + 10 ml ethanol | $9.8 \times 10^9$ | $2.2 \times 10^{10}$ |
| 26 | 50 ml n-hexane + 50 ml ethanol | $1.9 \times 10^8$ | $4.9 \times 10^9$ |
| | Secondary Alcohols | | |
| 27 | 90 ml GENKLENE + 10 ml isopropyl alcohol | $1.2 \times 10^8$ | $1.7 \times 10^9$ |
| | Tertiary Alcohols | | |
| 28 | 90 ml GENKLENE + 10 ml tert-butyl alcohol | $4.3 \times 10^8$ | $4.7 \times 10^9$ |
| | Polyhydric Alcohols | | |
| 29 | 98 ml GENKLENE + 2 ml propan-1,3 diol | $2.0 \times 10^8$ | $3.4 \times 10^9$ |
| 30 | 98 ml GENKLENE + 2 ml 2 methyl pentan-2,4-diol | $5.8 \times 10^{11}$ | $2.4 \times 10^{11}$ |
| 31 | 98.5 ml GENKLENE + 1.5 ml 38% aqueous formaldehyde (sat'd soln) | $1.5 \times 10^8$ | $2.2 \times 10^9$ |
| 32 | 98.5 ml GENKLENE + 1.5 ml distilled water (sat'd soln) | $2.2 \times 10^{12}$ | $5.2 \times 10^{11}$ |

EXAMPLE 33

To demonstrate that enhancement of surface conductivity of a latent antistatic layer may be effected by exposure to the vapour of an interactive solvent medium, a sample of film prepared according to Example 1 (without the solvent wash treatment, and having a surface resistivity (60% RH; 20° C.) of $5 \times 10^{12}$ ohm/-square) was suspended for a period of 30 seconds at a distance of about 20 mm above the surface of a beaker containing methanol at ambient temperature. After exposure, the sample was observed to have a surface resistivity (60% RH 20° C.) of $3 \times 10^9$ ohm/square.

EXAMPLES 34(a)/(b) TO 44(a)/(b)

To demonstrate the suitability of various film supports for use in accordance with the invention, a first set (a) of samples of the non-etched films listed in the following Table were coated respectively with the electroconductive solution defined in Example 1 with the addition of 1% v/v propan-1,3-diol. The applied coatings were dried as described in Example 1, but further treatment with an interactive solvent medium was not effected. The applied coating was therefore a 1-coat system.

A second set (b) of samples of the same non-etched films were treated with the electroconductive solution of Example 1 and subsequently treated, as described, with an interactive solvent medium comprising GENKLENE:Ethanol (9:1 by volume). The applied coating was therefore a 2-coat system.

In Example 44 the polyester film samples were first etched as described in Example 1.

Surface resistivities measured as described in Examples 4 and 5 are recorded in the following Table.

| Support | Manufacturer | Thickness um | Polymer Type | Comments |
|---|---|---|---|---|
| ACLAR Type 33C | Allied Chem Corp | 130 | pVF/pVC copolymer | antistatics applied to non corona treated side |
| PROPAFILM type ML60 | ICI | 60 | polypropylene | antistatic dried at 90° C. |
| PVC | Staufen | 250 | pVC | dried at 80° C. |
| MELINEX type 850 | ICI | 20 | coextruded PET | |
| ICK34 | Bexford | 90 | polycarbonate | |
| X | Bexford | 70 | polycarbonate/urethane copolymer | |
| PTO-198 | Bexford | 198 | cellulose triacetate (plasticised) | |
| Polystyrene clear | — | 125 | polystyrene | |
| Polystyrene matt | — | 125 | polystyrene | |
| MELINEX aluminised | ICI | 75 | aluminised PET | antistatics applied to Al treated side |

EXAMPLES 45 TO 47

To demonstrate the improved permanence of electroconductive coatings according to the invention the procedure of Example 2 was repeated using in turn as the antistatic medium:

(45) the electroconductive solution described in Example 1

(46) solution C—a 0.4 wt % solution of the sodium salt of a styrene—maleic anhydride copolymer in an aqueous-organic solvent medium.

(47) Solution D—0.6 wt % solution of the sodium salt of a formaldehyde—phenol sulphonic acid condensate in an aqueous-organic solvent medium.

Surface resistivities measured after washing with the interactive wax solvent wash and again after the simulated photographic processing technique described in Example 1 are recorded in the following Table.

| Example | Antistatic Medium | Surface Resistivity (ohm/square); (60% RH 20° C.) | |
|---|---|---|---|
| | | before processing | after processing |
| 45 | As Example 1 | $3.6 \times 10^8$ | $1.2 \times 10^9$ |
| 46 | Solution C* | $4.7 \times 10^8$ | $3.0 \times 10^{13}$ |
| 47 | Solution D* | $6.3 \times 10^8$ | $5.0 \times 10^{13}$ |

*Comparative: not according to the invention

The active ingredients of solutions C and D respectively are in commercial use as antistatic agents in photographic assemblies. Such antistatic systems, as demonstrated by the above results, are much less resistant to photographic processing than a system according to the invention.

I claim:

1. A method of producing a coated article comprising applying to at least one surface of a polymeric substrate a coating composition comprising a polymeric electrolyte and a polyepoxy resin in a weight ratio from 1:20 to 1:0.5, the polymeric electrolyte being a cationic electroconductive polymer capable of conducting a current through ionization.

2. A method according to claim 1 wherein the coating composition is applied from a solvent medium comprising an effective amount of a mutual solvent for the polymeric electrolyte and the polyepoxy resin, said mutual solvent having a boiling point, at atmospheric pressure, of at least 100° C.

* * * * *